(12) United States Patent
Nomura et al.

(10) Patent No.: US 8,565,060 B2
(45) Date of Patent: Oct. 22, 2013

(54) OPTICAL PICKUP DEVICE AND METHOD FOR MANUFACTURING THE SAME

(75) Inventors: Rika Nomura, Yokohama (JP); Hidenao Saito, Yokohama (JP); Yoshiro Konishi, Yokohama (JP)

(73) Assignee: Hitachi Media Electronics Co., Ltd., Oshu-shi (JP)

( * ) Notice: Subject to any disclaimer, the term of this patent is extended or adjusted under 35 U.S.C. 154(b) by 0 days.

(21) Appl. No.: 13/613,154

(22) Filed: Sep. 13, 2012

(65) Prior Publication Data

US 2013/0163400 A1 Jun. 27, 2013

(30) Foreign Application Priority Data

Dec. 21, 2011 (JP) ................. 2011-279931

(51) Int. Cl.
*G11B 7/00* (2006.01)

(52) U.S. Cl.
USPC ............... 369/112.24; 369/112.23; 369/44.32

(58) Field of Classification Search
USPC ................ 369/112.23, 112.24, 112.19, 44.32
See application file for complete search history.

(56) References Cited

U.S. PATENT DOCUMENTS

| | | | |
|---|---|---|---|
| 2002/0041562 A1* | 4/2002 | Redmond et al. | 369/112.19 |
| 2008/0181087 A1* | 7/2008 | Hayashi et al. | 369/112.24 |
| 2009/0034400 A1* | 2/2009 | Kasahara et al. | 369/112.23 |
| 2011/0122746 A1* | 5/2011 | Fujii et al. | 369/44.32 |

FOREIGN PATENT DOCUMENTS

| | | |
|---|---|---|
| JP | 2006-338811 A | 12/2006 |
| JP | 2008-176887 A | 7/2008 |

* cited by examiner

*Primary Examiner* — Van Chow
(74) *Attorney, Agent, or Firm* — Crowell & Moring LLP (57) ABSTRACT

The invention provides an optical pickup device that ensures complete curing of adhesive when a tilt adjusting holder is glued to an objective lens holder. The optical pickup device comprises: a light source; an objective lens for focusing light emitted from the light source onto an optical storage medium; a tilt adjusting holder to which to secure the objective lens; and an objective lens holder to which to glue the tilt adjusting holder. The objective lens holder includes: adhesive joint sections for securing the tilt adjusting holder to the objective lens holder using an adhesive; a seat section on which the tilt adjusting holder abuts; and adhesive anti-overflow pockets, located between the adhesive joint sections and the seat section, for receiving the adhesive when the adhesive flows from the adhesive joint sections.

9 Claims, 5 Drawing Sheets

PRIOR ART

OPTICAL PICKUP DEVICE AND METHOD FOR MANUFACTURING THE SAME

CLAIM OF PRIORITY

The present application claims priority from Japanese patent application serial no. JP 2011-279931, filed on Dec. 21, 2011, the content of which is hereby incorporated by reference into this application.

BACKGROUND OF THE INVENTION

1. Field of the Invention

The present invention relates to optical pickup devices used for writing data on or reading data from optical storage media such as CDs (compact discs), DVDs (digital versatile discs), BDs (Blu-ray discs, trademark), and so forth. The invention also relates to methods for manufacturing such optical pickup devices.

2. Description of the Related Art

Optical pickup devices are used to write data on or read data from optical storage media such as CDs, DVDs, and BDs. Typically, an optical pickup device includes an optical system designed to guide the light emitted from a light-emitting device (e.g., laser diode) to an objective lens via lenses, a prism, a mirror, and other devices, thereby focusing the light onto an optical storage medium. The pickup device also include another optical system for allowing a photoelectric converter, which converts optical output into electric signals, to receive the light reflected from the optical storage medium via various lenses, a prism, a mirror, and other devices.

Figure 7:
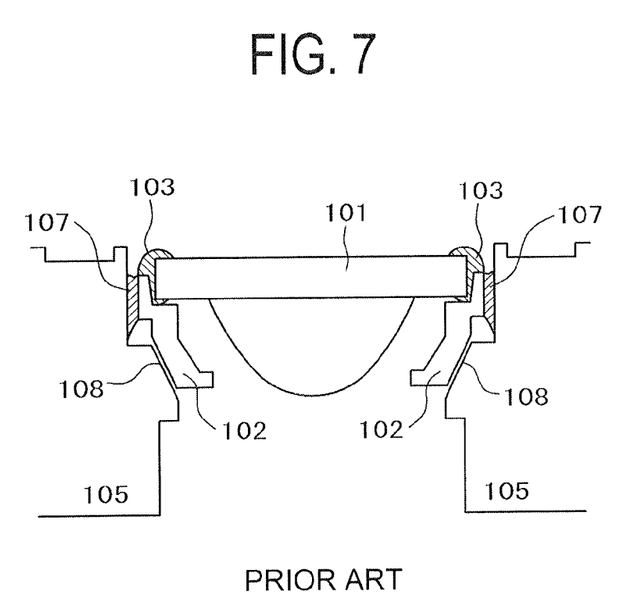
FIG. 7 is a cross section illustrating the adhesive joints of a conventional objective lens holder.

Among such components is the actuator including the objective lens. As illustrated in FIG. 7, a tilt adjusting holder 102 holds an objective lens 101. The tilt angle of this tilt adjusting holder 102 needs to be adjusted relative to an objective lens holder 105. Referring now to FIG. 7, tilt adjustment for the tilt adjusting holder 102 is discussed below.

Several methods exist to adjust the tilt angle of the tilt adjusting holder 102. One is to create a reference surface within the tilt adjusting holder 102 so that the position of the objective lens 101 can be adjusted in a direction of the optical axis (i.e., in the top or bottom direction of FIG. 7) and in a direction vertical to the optical axis. Once the position is set based on the reference surface, the objective lens 101 is glued to the tilt adjusting holder 102. Another is to provide a seat section 108 on the objective lens holder 105 such that the seat section 108 faces the outer surface of the tilt adjusting holder 102. Once the tilt angle of the tilt adjusting holder 102 is adjusted relative to the seat section 108 of the objective lens holder 105, the tilt adjusting holder 102 is glued to the objective lens holder 105 with an adhesive 107.

Typically, adhesive is not applied after the position of the tilt adjusting holder 102 has been set. Instead, to facilitate the task, the adhesive 107 is applied in advance to the adhesive joint sections of the objective lens 101 or to the adhesive joint sections of the tilt adjusting holder 102 or to the seat section 108. Tilt adjustment is then conducted for the tilt adjusting holder 102 to which the objective lens 101 has been glued with an adhesive 103. After the tilt adjustment, the adhesive 107 is cured, thereby securing the tilt adjusting holder 102 to the objective lens holder 105.

Examples of such a method include the method of JP-A-2006-338811 and the method of JP-A-2008-176887, in both of which a tilt adjusting holder is used for an actuator.

SUMMARY OF THE INVENTION

Discussed below with reference to FIG. 7 are problems associated with the adhesion of the tilt adjusting holder 102 to the objective lens holder 105. The following discussion is based on that assumption that an UV light curing adhesive is used as the adhesive 107.

When tilt adjustment is conducted for the tilt adjusting holder 102 and the objective lens holder 105, part of the adhesive 107 moves, due to its capillary action, through the space between the seat section 108 and the tilt adjusting holder 102 toward the inner side where the objective lens 101 is located. Thus, when the adhesive 107 is to be cured by applying UV light from above (i.e., in a direction of the optical axis), part of the adhesive 107 that has moved to the location that the UV light does not reach may fail to cure.

Therefore, for the purpose of ensuring complete curing of the adhesive 107, it is necessary to prevent the adhesive 107 from flowing past the seat section 108 toward the objective lens 101 when tilt adjustment is conducted for the tilt adjusting holder 102 and the objective lens holder 105.

It is preferred that the objective lens holder 105 and the tilt adjusting holder 102 be formed from engineering plastics such as LCPs (liquid crystal polymers), PBT (polybutylene terephthalate), and PPS (polyphenylene sulfide) in light of moldability and mechanical strength and from the necessity to glue lenses to those holders 105 and 102 with submicron order accuracy. However, LCPs, PBT, and PPS are generally lower in UV light transmittance than polycarbonate and acrylic-based materials which are high in UV light transmittance. Thus, it is not realistic to increase the UV light transmittance of those holders for the purpose of ensuring complete curing of UV light curing adhesive.

In view of the above, it is necessary to provide an optical pickup device in which adhesive joint sections can be reliably irradiated with UV light even when engineering plastics low in UV light transmittance (e.g., LCPs, PBT, PPS, etc.) are used for the materials of the tilt adjusting holder and the objective lens holder, which are to be glued to each other.

The present invention provides several means for solving the above problems. In one representative aspect, the invention is an optical pickup device comprising: a light source; an objective lens for focusing light emitted from the light source onto an optical storage medium; a tilt adjusting holder to which to secure the objective lens; and an objective lens holder to which to glue the tilt adjusting holder. The objective lens holder includes: adhesive joint sections for securing the tilt adjusting holder to the objective lens holder using an adhesive; a seat section on which the tilt adjusting holder abuts; and adhesive anti-overflow pockets, located between the adhesive joint sections and the seat section, for receiving the adhesive when the adhesive flows from the adhesive joint sections.

The present invention ensures complete curing of a UV light curing adhesive even when engineering plastics are used for the material of the tilt adjusting holder of an optical pickup device. Thus, the invention provides optical pickup devices of reliable quality.

DETAILED DESCRIPTION OF THE EMBODIMENT

Figure 1:
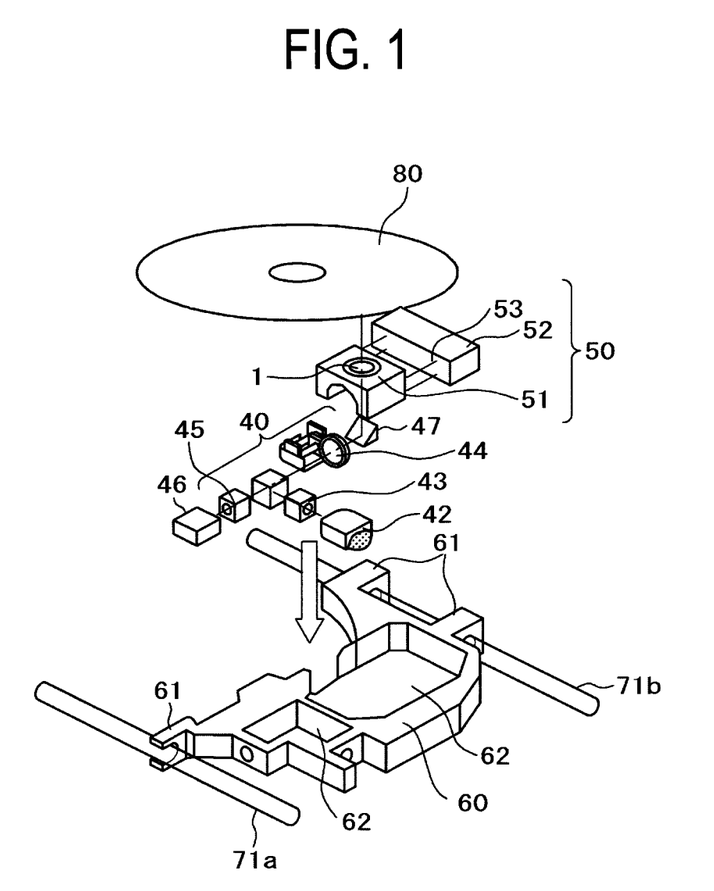
FIG. 1 is an exploded perspective view of an optical pickup device according to one embodiment of the invention.

The structure of an optical pickup device according to one embodiment of the invention will now be described with reference to FIG. 1. FIG. 1 is an exploded perspective view of the optical pickup device, showing its state before an optical component assembly 40 (described later) and other components are glued to a pickup casing 60.

As illustrated in FIG. 1, the optical pickup device includes the following components: a light-emitting device 42 (a light source such as a laser diode); the optical component assembly 40; a photoelectric converter 46 (a light receiver); an objective lens actuator 50; and the pickup casing 60 for housing these pickup components.

The objective lens actuator 50 is an optical module that moves an objective lens 1, thereby converging light on the recording surface of an optical disc 80 (i.e., an optical storage medium) and accurately reading data from the disc 80. Specifically, the objective lens actuator 50 moves the objective lens 1 in a focusing direction (a direction that gets closer to or away from the disc surface), in a tracking direction (a radial direction of the disc 80), and in a radial tilt direction (a direction that tilts in a radial direction of the disc 80) with high positional accuracy (submicron order accuracy). Thus, the objective lens actuator 50 allows the objective lens 1 to follow the movement of the disc even when the disc is undergoing surface vibration or eccentric rotation.

The objective lens actuator 50 includes the following components: an objective lens holder 51 for holding the objective lens 1; a securing member 52 for securing the objective lens actuator 50 to the pickup casing 60; and wires 53 with moderate damping capacity for supporting the objective lens holder 51 to the securing member 52 in a displaceable manner.

The wires 53 extend from within the objective lens holder 51, penetrate the securing member 52, and are connected to a printed circuit board (not shown) attached to the back side of the securing member 52. Receiving electric power from the printed circuit board, the wires 53 displaces the objective lens holder 51 which holds the objective lens 1.

The light emitted from the light-emitting device 42 passes through the optical component assembly 40 including a grating lens 43, a coupling lens 44, a reflective mirror 47, and the like. The light is then guided through the objective lens 1 located within the objective lens holder 51, so that the light can converge on the recording surface of the optical disc 80. Thereafter, the light reflected from the disc passes through some components of the optical component assembly 40 such as a detector lens 45 and the like and eventually reaches the photoelectric converter 46. This signal obtained by the photoelectric converter 46 is used to control the electric current to be fed to the wires 53 during the operation of the objective lens actuator 50. This allows the objective lens 1 to follow the movement of the optical disc 80 with high positional accuracy.

The pickup casing 60 includes the following components: grip sections 61 for securing the pickup casing 60 to shafts 71a and 71b in a slidable manner; and housing sections 62 for housing the optical component assembly 40 and the objective lens actuator 50.

The grip sections 61 secures the pickup casing 60 to the shafts 71a and 71b such that the pickup casing 60 slides in a radial direction of the optical disc 80, moving along the shafts 71a and 71b. When the optical component assembly 40 and the objective lens actuator 50 are housed in the housing sections 62, they are glued to the best positions based on the consideration of their optical characteristics.

When gluing the optical component assembly 40 and the objective lens actuator 50 to the pickup casing 60, it is common to use UV light curing adhesives or thermoset adhesives (either acrylic-based or epoxy-based).

EXAMPLE 1

Figure 2:
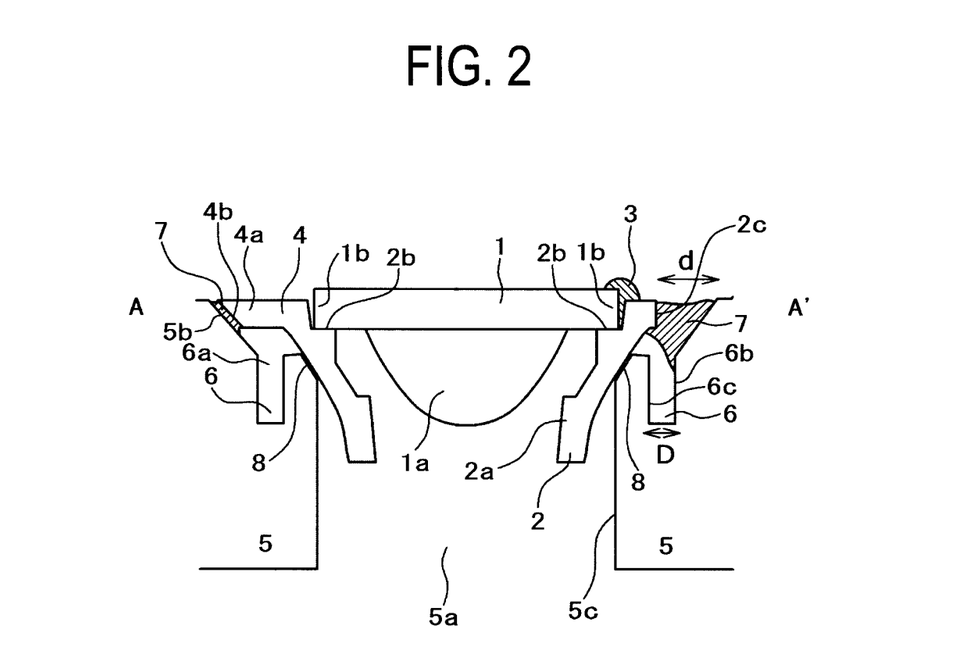
FIG. 2 is a cross section illustrating the adhesive joints of an objective lens holder according to Example 1 of the invention.
Figure 3A:
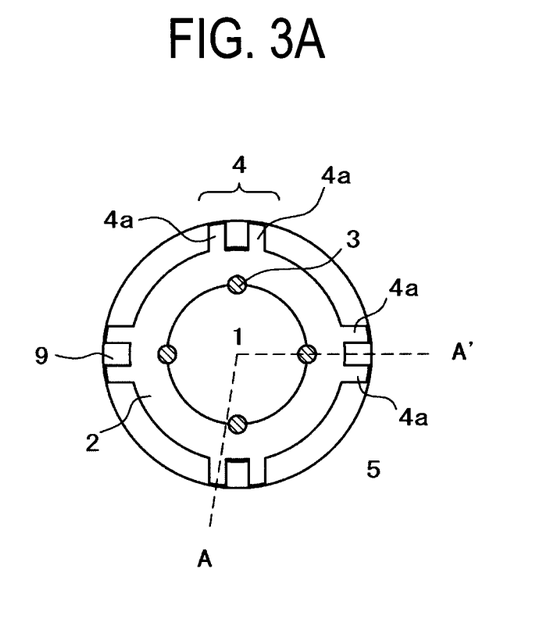
FIGS. 3A and 3B are top views illustrating the adhesive joints of the objective lens holder of Example 1.
Figure 3B:
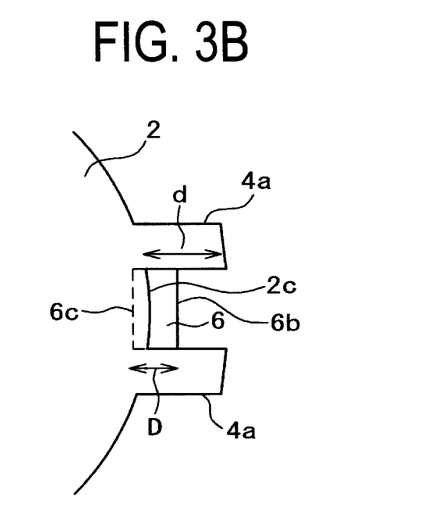

Next described with reference to FIGS. 2, 3A, and 3B is Example 1 of the present embodiment of the invention. FIG. 2 is a cross section illustrating the adhesive joints of an objective lens holder according to Example 1 (i.e., a cross section illustrating the adhesion of a tilt adjusting holder 2 to an objective lens holder 5). FIG. 2 is taken from A-A' Line of the top view of FIG. 3A. FIG. 3A is a top view illustrating the adhesive joints of the objective lens holder 5 from above. FIG. 3B is a partially enlarged view of FIG. 3A.

In this Example 1, the tilt adjusting holder 2 is provided with projecting sections 4 that serve as adhesive joints. Also, adhesive anti-overflow grooves 6 are formed in the objective lens holder 5 such that the anti-overflow grooves 6 are more inwardly located than the adhesive joints of the tilt adjusting holder 2 (i.e., located on the side closer to the objective lens 1). Further, a tilt adjusting seat section 8 is formed on the objective lens holder 5 such that the seat section 8 is more inwardly located than the anti-overflow grooves 6 (i.e., located on the side closer to the objective lens 1). Thus, when tilt adjustment is conducted for the tilt adjusting holder 2 and the objective lens holder 5, the above structure of Example 1 prevents a UV light curing adhesive from flowing inwardly past the seat section 8 (i.e., toward the objective lens' side), which is located between the tilt adjusting holder 2 and the objective lens holder 5. This means that the UV light curing adhesive will fail to cure. Moreover, to make UV light reach the anti-overflow grooves 6, a through-hole or a clearance 9 is formed in each projecting section 4 of the tilt adjusting holder 2 such that the clearance 9 extends in an axial direction of the UV light (i.e., extends vertically). Thus, the adhesive joints and the anti-overflow grooves 6 are irradiated with the UV light in a reliable manner.

In the present embodiment (consisting of Examples 1 to 3), it is preferred in light of moldability and mechanical strength that the tilt adjusting holder 2 and the objective lens holder 5 be molded in mainly engineering plastics which are low in UV light transmittance (e.g., LCPs, PBT, PPS, and the like). Note also that in the present embodiment, before the tilt adjusting holder 2 is glued to the objective lens holder 5, the following steps are performed: 1) glue the objective lens 1 to the tilt adjusting holder 2, 2) place the tilt adjusting holder 2 on the seat section 8 of the objective lens holder 5, and 3) adjust the tilt angle of the tilt adjusting holder 2 relative to the objective lens holder 5 to determine the optimal position for the tilt adjusting holder 2. The adhesion of the tilt adjusting holder 2 to the objective lens holder 5 is to be done after these steps.

Example 1 of the present embodiment is discussed further below. It should be noted first that the top and bottom directions of FIG. 2 are referred to as vertical directions, the right and left directions of FIG. 2 as horizontal directions, and directions extending horizontally from the central axis of the objective lens 1 as radial directions.

The objective lens 1 includes a lens section 1a which is substantially hemisphere-shaped in vertical cross section and is circular when viewed from above. The objective lens 1 further includes a ring-shaped support section 1b that surrounds the lens section 1a. The objective lens 1 is supported by the tilt adjusting holder 2 when the tilt adjusting holder 2 supports the support section 1b of the objective lens 1.

As illustrated in FIG. 3A, the tilt adjusting holder 2 includes the multiple projecting sections 4 (four in the example of FIG. 3A), which are arranged along the outer circumference of the top section of a cylinder 2a and protrude outwardly in directions vertical to the central axis of the cylinder 2a (i.e., protrude outwardly in horizontal directions). The projecting sections 4 serve as the adhesive joints for securing the tilt adjusting holder 2 to the objective lens holder 5 (later described in detail). The cylinder 2a is used to prevent the gas generated from an adhesive 7 from flowing toward the objective lens 1 (i.e., toward the inner side). Further, as illustrated in FIG. 2, a support rim 2b is formed on the inner circumferential side of the top section of the cylinder 2a. The support rim 2b is ring-shaped when viewed from above and is a depressed portion located one step down from the top surfaces of the projecting sections 4. The top surface of this support rim 2b is designed to support the bottom surface of the support section 1b of the objective lens 1.

To glue the objective lens 1 to the tilt adjusting holder 2, the support section 1b of the objective lens 1 is first placed on the support rim 2b of the tilt adjusting holder 2, with the convex-shaped lens section 1a of the objective lens 1 facing downward and with the optical axis direction of the objective lens 1 made parallel to a vertical direction. An adhesive 3 is then applied from above to the boundary between the support section 1b and the support rim 2b.

In the case of FIG. 3A, the four projecting sections 4 are located at equal horizontal intervals along the outer circumference of the top section of the cylinder 2 (i.e., located at 90 degrees horizontal interval with respect to the central axis of the objective lens 1). Each of the projecting sections 4 includes multiple projections 4a (two in the case of FIG. 3A). Each projection 4a is substantially rectangular when viewed from above. The outermost end 4b of each projection 4a has an oblique shape in vertical cross section such that the lower side of the shape has gets closer to the optical axis of the objective lens 1. That is, the outermost ends 4b are each shaped like an overhang. The outermost ends 4b serve as the adhesive joints for securing the tilt adjusting holder 2 to the objective lens holder 5.

As illustrated in FIG. 3A, a single clearance 9 is formed between the two horizontally arranged projections 4a of each projecting section 4 such that each clearance 9 penetrates each projecting section 4 in the optical axis direction of the objective lens (i.e., in a vertical direction). The clearances 9 are provided to irradiate from above the adhesive joints and the anti-overflow grooves 6 (described later) with UV light.

As illustrated in FIG. 2, the objective lens holder 5 includes a vertically extending through-hole 5a which is substantially cylinder-shaped. The tilt adjusting holder 2 to which the objective lens 1 has been glued is inserted from above into this through-hole 5a, followed by tilt adjustment for the tilt adjusting holder 2 (i.e., adjustment of the tilt angle of the objective lens 1). Further, the seat section 8 is located at the top section of the vertically extending cylinder wall 5c that forms the through-hole 5a. The seat section 8 is ring-shaped when viewed from above and has an oblique shape in vertical cross section such that the upper side of the oblique shape gets farther away from the optical axis of the objective lens 1. In the present embodiment, the seat section 8 is shaped like a sphere support structure, formed from part of the inner side of a sphere. The outer surface of the tilt adjusting holder 2 that abuts on the seat section 8 is also shaped like a sphere support structure, formed from part of the outer side of a sphere of the same radial size. Thus, when the tilt adjusting holder 2 is placed on the seat section 8 and then slid relative to the seat section 8, all-directional tilt adjustment can be achieved, meaning that the direction of the objective lens 1 can be adjusted as desired.

Note that the seat section 8 can be of other shapes as long as the tilt angle of the tilt adjusting holder 2 can be adjusted.

As illustrated in FIG. 2, openings 6a are formed in the objective lens holder 5. The openings 6a each communicate with one of the anti-overflow grooves 6 and are located more outwardly in a horizontal direction and more upwardly than the seat section 8. A support section 5b is also formed on the objective lens holder 5. The support section 5b faces the outermost ends 4b of the projecting sections 4 and is located more outwardly in a horizontal direction and more upwardly than the openings 6a of the anti-overflow grooves 6. The support section 5b is ring-shaped when viewed from above and has an oblique shape in vertical cross section such that the upper side of the oblique shape gets farther away from the optical axis of the objective lens 1. The support section 5b serves as the adhesive joint for gluing the outermost ends 4b to the support section 5b. To glue the outermost ends 4b to the support section 5b, the adhesive 7 is applied between them. For this reason, the space between the support section 5b and the outermost ends 4b is wider than the space between the seat section 8 and the tilt adjusting holder 2.

Located more outwardly in a horizontal direction than the support section 5b is the substantially flat top surface of the objective lens holder 5. As illustrated in FIGS. 2 and 3B, distance d is the distance between the outer circumferential edge 2c of the tilt adjusting holder 2 and the outer circumferential edge of the support section 5b of the objective lens holder 5 (i.e., distance d is the length of a clearance 9 as measured in a radial direction). In the case of FIG. 3B, distance d is substantially the length of a projection 4a as measured in a radial direction. To glue the tilt adjusting holder 2 to the objective lens holder 5, the UV light curing adhesive 7 is first applied onto the adhesive joint positions of the support section 5b. The projecting sections 4 of the tilt adjusting holder 2 are then placed on these adhesive joint positions on which the adhesive has been applied. With the above procedure, each clearance 9 located between the two projections 4a of a projecting section 4 and the clearances between the outermost ends 4b and the support section 5b can be filled with the adhesive 7.

The openings 6a of the adhesive anti-overflow grooves 6 are formed in the sidewall of the objective lens holder 5. The openings 6a are located between the seat section 8 and the support section 5b, i.e., at the positions right below the projecting sections 4. The anti-overflow grooves 6 each extend vertically in the sidewall of the objective lens holder 5 and thus have a depth in a vertical direction. The anti-overflow grooves 6 are concave portions with sidewalls that are parallel to the optical axis of the objective lens 1 (i.e., parallel to a direction of the UV light). Preferably, one anti-overflow groove 6 needs to be provided at least at each position right below one of the projecting sections 4, but it is also possible to provide a single continuous anti-overflow groove (i.e., a ring-shaped groove when viewed from above) in the sidewall of the objective lens holder 5.

It is of course possible to provide discontinuous anti-overflow grooves right below the application points of the adhesive 7. Although the presence of anti-overflow grooves reduces the mechanical strength of the seat section 8, such discontinuous anti-overflow grooves can prevent the seat section 8 from losing its strength. In the present embodiment, the anti-overflow grooves 6 are provided only at the positions directly below the application points of the adhesive 7.

As stated above, a UV light curing adhesive is used as the adhesive 7 to glue the tilt adjusting holder 2 to the objective lens holder 5. Thus, in light of its curing characteristics at a deep position, it is preferred that the depth of the anti-overflow grooves 6 be 2.0 mm or less.

In light of UV light curing characteristics, it is also preferred that distance D be smaller than distance d, where distance D is the length of an anti-overflow groove 6 as measured in a radial direction, and distance d is the length of a clearance 9 as measured in a radial direction. At the same time, it is further preferred that the overlapping area between the horizontal area of one anti-overflow groove 6 and the horizontal area of one clearance 9 in a UV light direction (i.e., in a vertical direction or the optical axis direction of the objective lens 1) be 300 μm long or greater as measured in a horizontal direction. In other words, the area that vertically penetrates the anti-overflow groove 6 and the clearance 9 is preferably 300 μm long or greater as measured in a horizontal direction. The above allows the UV light passing vertically through the clearance 9 to reliably reach the adhesive 7 located within the anti-overflow groove 6.

As illustrated in FIG. 2, each anti-overflow groove 6 includes an outer sidewall 6b and an inner sidewall 6c, both extending in a vertical direction. The outer sidewall 6b is located farther away from the axis of the objective lens 1 than the inner sidewall 6c, and the horizontal position of the outer sidewall 6b lies within the horizontal area of the associated clearance 9 (see FIG. 3B). Because all the outer sidewalls 6b are connected to the support section 5b on which to apply the adhesive 7, the adhesive 7 flows downward along the outer sidewalls 6b into the anti-overflow grooves 6. When the adhesive 7 is flowing into each anti-overflow groove 6, its horizontal thickness is substantially 300 μm or less. Therefore, when the area that vertically penetrates an anti-overflow groove 6 and a clearance 9 is 300 μm long or greater as measured in a horizontal direction, the UV light passing vertically through the clearance 9 can reliably reach the adhesive 7 located within the anti-overflow groove 6. If that area is less than 300 μm long as measured in a horizontal direction, the UV light may fail to reach the inner side of the adhesive 7 in the anti-overflow groove 6, preventing the adhesive 7 from curing.

It is also preferred that more than 60% of the horizontal area of an anti-overflow groove 6 overlap the horizontal area of the associated clearance 9. If so, the UV light passing vertically through the clearance 9 can reliably reach the adhesive 7 in the anti-overflow groove 6. This is because distance D of the anti-overflow groove 6 as measured in a radial direction is 500 μm long or thereabout.

Next described is the adhesion method of Example 1 for gluing the tilt adjusting holder 2 to the objective lens holder 5. The adhesion is conducted through the following steps (1) to (4) (in the stated order).

(1) First, with the use of the adhesive 3, the objective lens 1 is glued to the tilt adjusting holder 2 via four adhesive joints. The adhesive 3 can be a thermoset adhesive or a UV light curing adhesive.

(2) The adhesive 7 is then applied to the adhesive joint positions of the support section 5b of the objective lens holder 5, at which the projecting sections 4 of the tilt adjusting holder 2 are to be glued to the support section 5b. Thereafter, the projecting sections 4 are placed on the adhesive joint positions to which the adhesive 7 has been applied. The adhesive 7 is a UV light curing adhesive. With the above steps, it is possible to apply the adhesive 7 into each clearance 9 located between the two projections 4a of a projecting section 4 and into the clearances between the outermost ends 4b of the projecting sections 4 and the support section 5b of the objective lens holder 5.

While part of the applied adhesive 7 may flow downward due to its capillary action, that part of the adhesive 7 will flow into the anti-overflow grooves 6. Thus, the anti-over flow grooves 6 prevent part of the adhesive 7 that flows downward from moving into the space between the seat section 8 and the tilt adjusting holder 2.

(3) The angle of the tilt adjusting holder 2 relative to the objective lens holder 5 is then adjusted, and the tilt adjusting holder 2 is properly positioned.

(4) After the positioning, UV light is applied from above to the projecting sections 4 and the anti-overflow grooves 6, thereby curing the adhesive 7 located near the projecting sections 4 and within the anti-overflow grooves 6. Since the anti-overflow grooves 6 are concave portions extending in a direction of the UV light, the adhesive 7 located within the anti-overflow grooves 6 can be irradiated with the UV light. Since each projecting section 4 has a clearance 9 formed between two projections 4a, the UV light can pass through the clearances 9 to reach the adhesive 7 located beneath the projecting sections 4 and within the anti-overflow grooves 6. Thus, the adhesive 7 fails to cure, thereby preventing the adhesive 7 from generating unwanted gas.

As above, the optical pickup device of Example 1 is designed such that when the tilt angle of the tilt adjusting holder 2 relative to the objective lens holder 5 is adjusted, the adhesive 7 is prevented from moving past the ring-shaped seat section 8 toward the objective lens 1 (i.e., inwardly) due to its capillary action. Thus, the adhesive 7 (UV light curing adhesive) will move to positions that the UV light does not reach, assuring complete curing of the adhesive 7.

Moreover, a clearance 9 is provided, as stated above, between two projections 4a of each projecting section 4 of the tilt adjusting holder 2, so that the UV light can reach the anti-overflow grooves 6. Thus, the adhesive joints and the anti-overflow grooves 6 can be irradiated with the UV light in a reliable manner.

In the example of FIG. 3, four adhesive joints are provided between the tilt adjusting holder 2 and the objective lens holder 5, but the number of adhesive joints between these two components (i.e., the number of adhesive joints required after tilt adjustment) only needs to be more than two. Also, the number of adhesive joints between the tilt adjusting holder 2 and the objective lens holder 5 can be different from that between the objective lens 1 and the tilt adjusting holder 2 (in the example of FIG. 3, the latter number is four).

EXAMPLE 2

Figure 4:
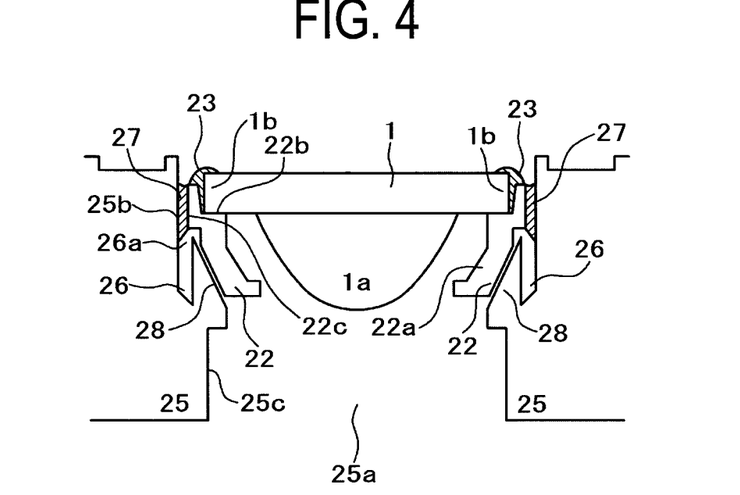
FIG. 4 is a cross section illustrating the adhesive joints of an objective lens holder according to Example 2 of the invention.

Next described with reference to FIG. 4 is Example 2 of the present embodiment of the invention. FIG. 4 is a cross section illustrating the adhesive joints of an objective lens holder according to Example 2 (i.e., a cross section illustrating the adhesion of a tilt adjusting holder 22 to an objective lens holder 25). In this Example 2 as well, the top and bottom directions of FIG. 4 are referred to as vertical directions, the right and left directions of FIG. 4 as horizontal directions, and directions extending horizontally from the central axis of the objective lens 1 as radial directions.

As illustrated in FIG. 4, the optical pickup device of Example 2 is formed by adding adhesive anti-overflow grooves 26 to the conventional pickup device of FIG. 7. The adhesive anti-overflow grooves 26 are provided right below the adhesive 27 that glues the tilt adjusting holder 22 to the objective lens holder 25. The adhesive anti-overflow grooves 26 each extend (and thus have a depth) in the optical axis direction of the objective lens 1 (i.e., in a vertical direction).

In FIG. 4, the same reference numerals as those used in FIGS. 2, 3A, and 3B (Example 1) denote identical components, which will not be described again. The adhesion method of Example 2 for gluing the tilt adjusting holder 22 to the objective lens holder 25 will also not be described again because it is the same as the adhesion method of Example 1.

A support rim 22b is formed on the inner circumferential side of the top section of the cylinder 22a of the tilt adjusting holder 22. The support rim 22b is ring-shaped when viewed from above and is a depressed portion located one step down from the top surface of the tilt adjusting holder 22. The top surface of this support rim 22b is designed to support the bottom surface of the support section 1b of the objective lens 1.

Further, an adhesion surface 22c is formed on the outer circumferential side of the top section of the cylinder 22a. The adhesion surface 22c faces the adhesion surface 25b of the objective lens holder 25, extends vertically, and is ring-shaped when viewed from above.

To glue the objective lens 1 to the tilt adjusting holder 22, the support section 1b of the objective lens 1 is first placed on the support rim 22b of the tilt adjusting holder 22, with the convex-shaped lens section 1a of the objective lens 1 facing downward and with the optical axis direction of the objective lens 1 made parallel to a vertical direction. An adhesive 23 is then applied from above to the boundary between the support section 1b and the support rim 22b.

As illustrated in FIG. 4, the objective lens holder 25 includes a vertically extending through-hole 25a which is substantially cylinder-shaped. The tilt adjusting holder 22 to which the objective lens 1 has been glued is inserted from above into this through-hole 25a, followed by tilt adjustment for the objective lens 1. Further, a seat section 28 is located at the top section of the vertically extending cylinder wall 25c that forms the through-hole 25a. The seat section 28 is ring-shaped when viewed from above and has an oblique shape in vertical cross section such that the upper side of the oblique shape gets farther away from the optical axis of the objective lens 1. In Example 2 as well, the seat section 28 and the outer surface of the tilt adjusting holder 22 that abuts on the seat section 28 are each shaped like a sphere support structure. Thus, when the tilt adjusting holder 22 is placed on the seat section 28 and then slid relative to the seat section 28, the direction of the objective lens 1 can be adjusted as desired.

Openings 26a are formed in the objective lens holder 25. The openings 26a each communicate with one of the anti-overflow grooves 26 and are located more outwardly in a horizontal direction and more upwardly than the seat section 28. The above-mentioned adhesion surface 25b, which faces the adhesion surface 22c of the tilt adjusting holder 22, is located above the openings 26a of the anti-overflow grooves 26. The adhesion surface 25b extends vertically and is ring-shaped when viewed from above.

To glue the tilt adjusting holder 22 to the objective lens holder 25, the UV light curing adhesive 27 is first applied onto the adhesion surface 25b of the objective lens holder 25. The tilt adjusting holder 22 is then placed on the objective lens holder 25 such that the tilt adjusting holder 22 touches the adhesion surface 25b to which the adhesive 27 has been applied.

The openings 26a of the adhesive anti-overflow grooves 26 are formed in the sidewall of the objective lens holder 25. The openings 26a are located between the seat section 28 and the adhesion surface 25b in a vertical direction as well as in a horizontal direction. The anti-overflow grooves 26 each extend vertically and thus have a depth in a vertical direction. The anti-overflow grooves 26 are concave portions with sidewalls that are parallel to a UV light direction. Preferably, one anti-overflow groove 26 needs to be provided right below each position of the adhesion surface 25b to which the adhesive 27 is to be applied, but it is also possible to provide a single continuous anti-overflow groove (i.e., a ring-shaped groove when viewed from above) in the sidewall of the objective lens holder 25.

As stated above, a UV light curing adhesive is used as the adhesive 27 to glue the tilt adjusting holder 22 to the objective lens holder 25. Thus, in light of its curing characteristics at a deep position, it is preferred that the depth of the anti-overflow grooves 26 be 2.0 mm or less.

As above, similar to Example 1, the optical pickup device of Example 2 is designed such that when the tilt angle of the tilt adjusting holder 22 relative to the objective lens holder 25 is adjusted, the adhesive 27 is prevented from moving past the ring-shaped seat section 28 toward the objective lens 1 due to its capillary action. Thus, the adhesive 27 (UV light curing adhesive) will move to positions that the UV light does not reach, assuring complete curing of the adhesive 27.

EXAMPLE 3

Figure 5:
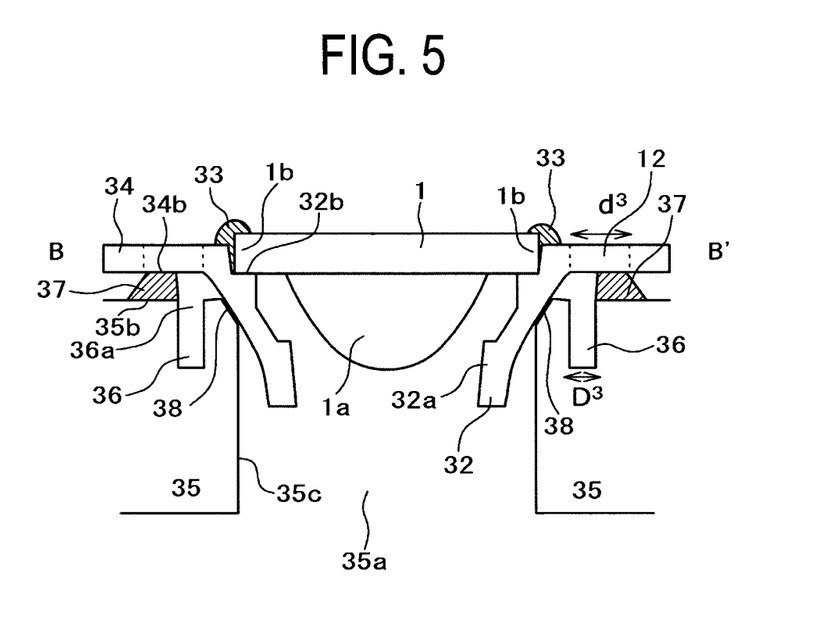
FIG. 5 is a cross section illustrating the adhesive joints of an objective lens holder according to Example 3 of the invention.
Figure 6:
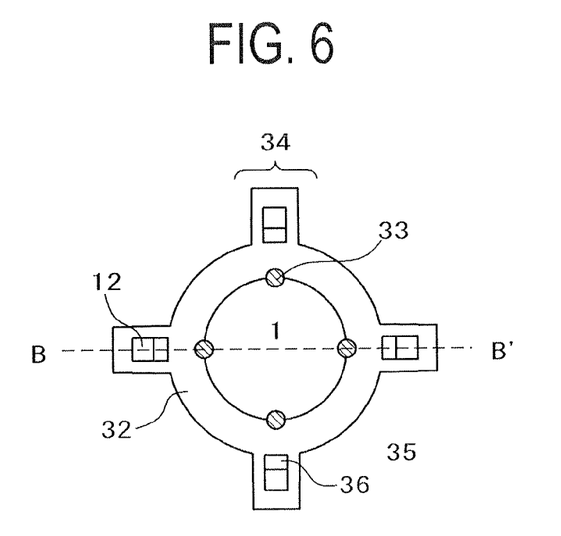
FIG. 6 is a top view illustrating the adhesive joints of the objective lens holder of Example 3.

Next described with reference to FIGS. 5 and 6 is Example 3 of the present embodiment of the invention. FIG. 5 is a cross section illustrating the adhesive joints of an objective lens holder according to Example 3 (i.e., a cross section illustrating the adhesion of a tilt adjusting holder 32 to an objective lens holder 35). FIG. 5 is taken from B-B' Line of the top view of FIG. 6. FIG. 6 is a top view illustrating the adhesive joints of the objective lens holder 35 from above. In this Example 3 as well, the top and bottom directions of FIG. 5 are referred to as vertical directions, the right and left directions of FIG. 5 as horizontal directions, and directions extending horizontally from the central axis of the objective lens 1 as radial directions.

As stated above, the optical pickup device of Example 1 (shown in FIGS. 2 and 3) includes the projecting sections 4 each comprising two projections 4a and a clearance 9 located between the two projections 4a. In contrast, the optical pickup device of Example 3 includes, in place of the projecting sections 4, projecting sections 34 that protrude outwardly in horizontal directions (see FIGS. 5 and 6). Each of the projecting sections 34 includes a vertically extending through-hole 12. As illustrated in FIG. 6, four projecting sections 34 are provided at different locations, and one adhesive anti-overflow groove 36 is provided at least right below the through-hole 12 of each projecting section 34. Each anti-overflow groove 34 extends in the optical axis direction of the objective lens 1 and thus has a depth in that direction.

In FIGS. 5 and 6, the same reference numerals as those used in FIGS. 2, 3A, and 3B (Example 1) denote identical components, which will not be described again. The adhesion method of Example 3 for gluing the tilt adjusting holder 32 to the objective lens holder 35 will also not be described again because it is the same as the adhesion method of Example 1.

A support rim 32b is formed on the inner circumferential side of the top section of the cylinder 32a of the tilt adjusting holder 32. The support rim 32b is ring-shaped when viewed from above and is a depressed portion located one step down from the top surface of the tilt adjusting holder 32. The top surface of this support rim 32b is designed to support the bottom surface of the support section 1b of the objective lens 1.

Further, adhesion surfaces 34b are formed on the bottom surfaces of the projecting sections 34 of the tilt adjusting holder 32. The adhesion surfaces 34b face the adhesion surface 35b of the objective lens holder 35 and extend in a horizontal direction.

To glue the objective lens 1 to the tilt adjusting holder 32, the support section 1b of the objective lens 1 is first placed on the support rim 32b of the tilt adjusting holder 32, with the convex-shaped lens section 1a of the objective lens 1 facing downward and with the optical axis of the objective lens 1 made parallel to a vertical direction. An adhesive 33 is then applied from above to the boundary between the support section 1b and the support rim 32b.

As illustrated in FIG. 5, the objective lens holder 35 includes a vertically extending through-hole 35a which is substantially cylinder-shaped. The tilt adjusting holder 32 to which the objective lens 1 has been glued is inserted from above into this through-hole 35a, followed by tilt adjustment for the objective lens 1. Further, a seat section 38 is located at the top section of the vertically extending cylinder wall 35c that forms the through-hole 35a. The seat section 38 is ring-shaped when viewed from above and has an oblique shape in vertical cross section such that the upper side of the oblique shape gets farther away from the optical axis of the objective lens 1. Similar to Example 1, the seat section 38 and the outer surface of the tilt adjusting holder 32 that abuts on the seat section 38 are each shaped like a sphere support structure. Thus, when the tilt adjusting holder 32 is placed on the seat section 38 and then slid relative to the seat section 38, the direction of the objective lens 1 can be adjusted as desired.

Openings 36a are formed in the objective lens holder 35. The openings 36a each communicate with one of the anti-overflow grooves 36 and are located more outwardly in a horizontal direction than the seat section 38 (i.e., located farther away from the objective lens 1 than the seat section 38). The above-mentioned adhesion surface 35b, which faces the adhesion surfaces 34b of the tilt adjusting holder 32, is located more outwardly than the openings 36a of the anti-overflow grooves 36. The adhesion surface 35b extends in a horizontal direction.

To glue the tilt adjusting holder 32 to the objective lens holder 35, a UV light curing adhesive 37 is first applied onto the adhesion surface 35b of the objective lens holder 35. The tilt adjusting holder 32 is then placed from above on the objective lens holder 35 such that the adhesion surfaces 34b of the tilt adjusting holder 32 touch the adhesion surface 35b to which the adhesive 37 has been applied.

The anti-overflow grooves 36 are formed on the top surface of the objective lens holder 35. The anti-overflow grooves 36 each extend vertically (thus having a depth in a vertical direction) and are located horizontally between the seat section 38 and the adhesion surface 35b. The anti-overflow grooves 36 are concave portions with sidewalls that are parallel to a UV light direction. Preferably, the anti-overflow grooves 36 need to be provided at least inside the adhesion surface 35b to which the adhesive 37 is to be applied, but it is also possible to provide a single continuous anti-overflow groove (i.e., a ring-shaped groove when viewed from above) on the top surface of the objective lens holder 35.

As stated above, a UV light curing adhesive is used as the adhesive 37 to glue the tilt adjusting holder 32 to the objective lens holder 35. Thus, in light of its curing characteristics at a deep position, it is preferred that the depth of the anti-overflow grooves 36 be 2.0 mm or less.

In light of UV light curing characteristics, it is also preferred that distance D3 be smaller than distance d3, where distance D3 is the length of an anti-overflow groove 36 as measured in a radial direction, and distance d3 is the length of a through-hole 12 as measured in a radial direction. At the same time, it is further preferred that the overlapping area between the horizontal area of one anti-overflow groove 36 and the horizontal area of one through-hole 12 in a UV light direction (i.e., in a vertical direction or the optical axis direction of the objective lens 1) be 300 μm long or greater as measured in a horizontal direction. In other words, the area that vertically penetrates the anti-overflow groove 36 and the through-hole 12 is preferably 300 μm long or greater as measured in a horizontal direction. The above allows the UV light passing vertically through the through-hole 12 to reliably reach the adhesive 37 located within the anti-overflow groove 36.

Similar to FIG. 2, each anti-overflow groove 36 includes an outer sidewall and an inner sidewall, both extending in a vertical direction. The horizontal position of the outer sidewall lies within the horizontal area of the associated through-hole 12. Because all the outer sidewalls of the anti-overflow grooves 36 are connected to the adhesion surface 35b on which to apply the adhesive 37, the adhesive 37 flows downward along the outer sidewalls into the anti-overflow grooves 36. When the adhesive 37 is flowing into each anti-overflow groove 36, its horizontal thickness is substantially 300 μm or less. Therefore, when the area that vertically penetrates an anti-overflow groove 36 and a through-hole 12 is 300 μm long or greater as measured in a horizontal direction, the UV light passing vertically through the through-hole 12 can reliably reach the adhesive 37 located within the anti-overflow groove 36.

As above, similar to Example 1, the optical pickup device of Example 3 is designed such that when the tilt angle of the tilt adjusting holder 32 relative to the objective lens holder 35 is adjusted, the adhesive 37 is prevented from moving past the ring-shaped seat section 38 toward the objective lens 1 due to its capillary action. Thus, the adhesive 37 (UV light curing adhesive) will move to positions that the UV light does not reach, assuring complete curing of the adhesive 37.

In the example of FIG. 6, four adhesive joints are provided between the tilt adjusting holder 32 and the objective lens holder 35, but the number of adhesive joints between these two components (i.e., the number of adhesive joints required after tilt adjustment) only needs to be more than two. Also, the number of adhesive joints between the tilt adjusting holder 32 and the objective lens holder 35 can be different from that between the objective lens 1 and the tilt adjusting holder 32 (in the example of FIG. 6, the latter number is four).

It should be noted that the present invention is not limited to the aforementioned embodiment, but covers various modifications without departing from the scope of the invention.

For instance, the adhesive anti-overflow grooves of the above embodiment, which are designed to receive the adhesive flowing from adhesive joints, can instead be holes or other similar structures.

What is claimed is:
1. An optical pickup device comprising:
a light source;
an objective lens for focusing light emitted from the light source onto an optical storage medium;

a tilt adjusting holder to which to secure the objective lens; and an objective lens holder to which to glue the tilt adjusting holder;

wherein the objective lens holder includes:
adhesive joint sections for securing the tilt adjusting holder to the objective lens holder using an adhesive;
a seat section on which the tilt adjusting holder abuts;
adhesive anti-overflow pockets, located between the adhesive joint sections and the seat section, for receiving the adhesive when the adhesive flows from the adhesive joint sections, and
the adhesive anti-overflow pockets are each formed as a concave portion the bottom of which is lower than the abutting position of the seat section and the tilt adjusting holder.

2. The optical pickup device according to claim 1, wherein the concave portion is formed extending in an optical axis direction of the objective lens.

3. The optical pickup device according to claim 1, wherein the tilt adjusting holder includes a plurality of projecting sections that serve as adhesive joint sections to be glued to the adhesive joint sections of the objective lens holder.

4. An optical pickup device comprising:
a light source;
an objective lens for focusing light emitted from the light source onto an optical storage medium;
a tilt adjusting holder to which to secure the objective lens; and
an objective lens holder to which to glue the tilt adjusting holder;
wherein the objective lens holder includes:
adhesive joint sections for securing the tilt adjusting holder to the objective lens holder using an adhesive;
a seat section on which the tilt adjusting holder abuts; and
adhesive anti-overflow pockets, located between the adhesive joint sections and the seat section, for receiving the adhesive when the adhesive flows from the adhesive joint sections,
wherein the tilt adjusting holder includes a plurality of projecting sections that serve as adhesive joint sections to be glued to the adhesive joint sections of the objective lens holder, and
wherein the adhesive anti-overflow pockets are each located right below one of the projecting sections of the tilt adjusting holder, so that each of the adhesive anti-overflow pockets can face one of the projecting sections.

5. An optical pickup device comprising:
a light source;
an objective lens for focusing light emitted from the light source onto an optical storage medium;
a tilt adjusting holder to which to secure the objective lens; and
an objective lens holder to which to glue the tilt adjusting holder;
wherein the objective lens holder includes:
adhesive joint sections for securing the tilt adjusting holder to the objective lens holder using an adhesive;
a seat section on which the tilt adjusting holder abuts; and
adhesive anti-overflow pockets, located between the adhesive joint sections and the seat section, for receiving the adhesive when the adhesive flows from the adhesive joint sections,
wherein the tilt adjusting holder includes a plurality of projecting sections that serve as adhesive joint sections to be glued to the adhesive joint sections of the objective lens holder, and
wherein a clearance or hole is formed at each of the projecting sections of the tilt adjusting holder, such that the clearances or holes penetrate the respective projecting sections in a direction parallel to the optical axis of the objective lens.

6. The optical pickup device according to claim 5,
wherein the adhesive anti-overflow pockets are each a concave portion extending in an optical axis direction of the objective lens, the concave portion having an outermost sidewall located farthest away from the objective lens,
wherein the horizontal position of each outermost sidewall lies within the horizontal area of each clearance or hole penetrating one of the projecting sections,
wherein distance d of each clearance or hole penetrating one of the projecting sections as measured in a radial direction is larger than distance D of each adhesive anti-overflow pocket as measured in a radial direction (d>D) when the radial direction is meant to be a direction extending horizontally from the central axis of the objective lens, and
wherein the overlapping area between the horizontal area of each adhesive anti-overflow pocket and the horizontal area of each clearance or hole penetrating one of the projecting sections in an optical axis direction of the objective lens is 300 μm long or greater as measured in a horizontal direction.

7. The optical pickup device according to claim 5,
wherein the adhesive anti-overflow pockets are each a concave portion extending in an optical axis direction of the objective lens, the concave portion having an outermost sidewall located farthest away from the objective lens,
wherein the horizontal position of each outermost sidewall lies within the horizontal area of each clearance or hole penetrating one of the projecting sections, and
wherein in an optical axis direction of the objective lens, 60% or more of the horizontal area of each adhesive anti-overflow pocket overlaps the horizontal area of each clearance or hole penetrating one of the projecting sections.

8. The optical pickup device according to claim 5,
wherein the depth of each adhesive anti-overflow pocket extending in an optical axis direction of the objective lens is 2 mm or less.

9. A method for manufacturing an optical pickup device comprising: a light source; an objective lens for focusing light emitted from the light source onto an optical storage medium; a tilt adjusting holder to which to secure the objective lens; and an objective lens holder to which to glue the tilt adjusting holder, the objective lens holder including: adhesive joint sections for securing the tilt adjusting holder to the objective lens holder using a UV light curing adhesive; and a seat section on which the tilt adjusting holder abuts,
the method comprising the steps of:
providing adhesive anti-overflow pockets between the adhesive joint sections and the seat section, so that the adhesive anti-overflow pockets can receive the UV light curing adhesive when the UV light curing adhesive flows from the adhesive joint sections;
applying the UV light curing adhesive to the adhesive joint sections of the objective lens holder;
placing the tilt adjusting holder to which the objective lens has been secured on the seat section of the objective lens holder;

performing tilt adjustment for the tilt adjusting holder placed on the seat section of the objective lens holder; and applying UV light onto the adhesive joint sections and the adhesive anti-overflow pockets of the objective lens holder, wherein the adhesive anti-overflow pockets are each formed as a concave portion the bottom of which is lower than the abutting position of the seat section and the tilt adjusting holder.

* * * * *